United States Patent [19]
O'Hanlon

[11] 3,964,678
[45] June 22, 1976

[54] SOLAR AIR CONDITIONER

[76] Inventor: Edward J. O'Hanlon, Assembly Point, Lake George, N.Y. 12845

[22] Filed: Nov. 4, 1974

[21] Appl. No.: 520,773

[52] U.S. Cl. .............................. 237/1 A; 126/270
[51] Int. Cl.² ........................................ F24J 3/02
[58] Field of Search ............ 237/1 A; 126/270, 271; 160/236

[56] References Cited
UNITED STATES PATENTS

| 246,626 | 9/1881 | Morse | 237/1 A X |
|---|---|---|---|
| 2,316,993 | 4/1943 | Sherwood | 126/270 X |
| 2,595,905 | 5/1962 | Telkes | 126/270 |
| 2,880,718 | 4/1959 | Ryder | 126/110 R X |
| 2,931,578 | 4/1960 | Thompson | 237/1 A |
| 3,894,685 | 7/1975 | Keyes et al. | 126/270 X |

*Primary Examiner*—William E. Wayner
*Assistant Examiner*—William E. Tapolcai, Jr.

[57] ABSTRACT

An inexpensive solar air conditioning system simple to install and operating with a minimum of mechanism. Without any water drip, so customary with the usual air conditioning equipment, it will bring into a shelter structure either cooled air or air warmed by noncostly solar energy.

1 Claim, 4 Drawing Figures

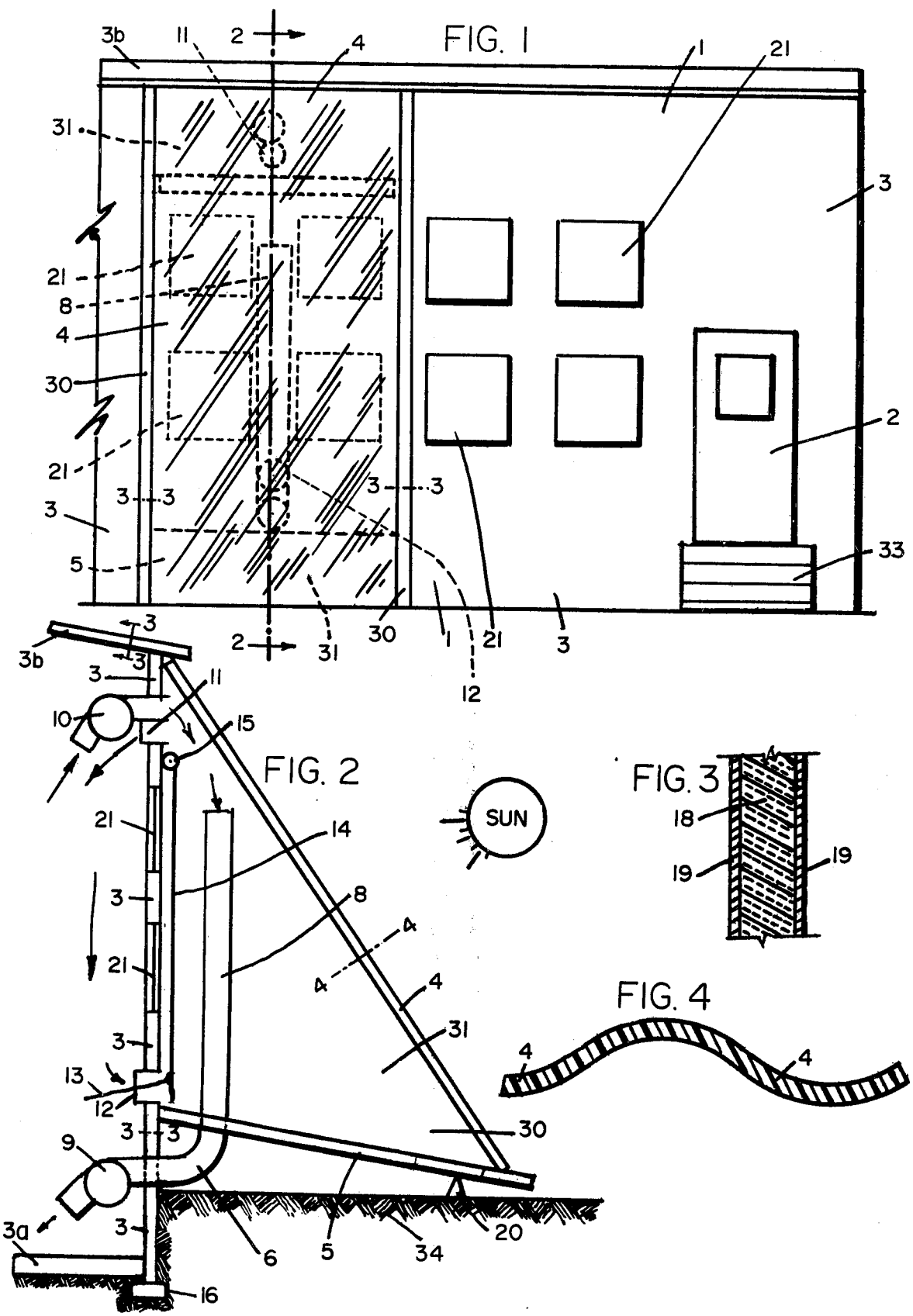

SOLAR AIR CONDITIONER

It is an improvement on Thompson U.S. Pat. No. 2,931,578.

In addition to these above advantages, my invention is simple and quick to produce by labor relatively unskilled in the art, largely avoiding expensive metal working, and producing a product that is of greatly reduced weight and therefore of lower costs to handle and to ship long distances. During the day time when the sun is shining it can be used to warm the air within any so-called shelter structure. While at night my solar air conditioning equipment may be employed to capture the early morning (shortly after midnight) cooler air, and bring it under a shelter cover and into a suitable cool air storage means if this is to be desired.

Moreover, it is made of lighter weight and less costly raw materials, much quicker and easier to obtain and shape into the final product. Further features will be evident as this specification continues. In the drawings:

FIG. 1 is a shelter structure. It may be an apartment house, a store, an office building, but in the present it is a dwelling, either a house or a live-in trailer that has been taken off from its wheels and permanently anchored within the ground. It is shown with my solar air conditioner fastened to its exterior surface.

FIG. 2 is a sectional view of my solar air conditioner shown along the section 2—2 in FIG. 1.

FIG. 3 is a sectional view of the wall, floor and roof details shown in position in FIG. 1 and FIG. 2 and shown in cross section in FIG. 3.

FIG. 4 is a cross sectional detailed view of the transparent (or translucent) surface shown in FIG. 1 and FIG. 2.

The various parts of my invention are designated by the following numerals. . .(1) Shelter structure; (2) Swinging door; (3) Shelter structure wall; (3a) Shelter structure floor; (3b) Shelter structure roof; (4) Transparent or translucent surface preferably corrugated: (5) Air conditioner slanting floor: (6) down draft air elbow: (7) Fastening devices: (8) Cool air down pipe: (9) electric blower: (10) Electric air blower: (11) Warm air admission opening; (12) Air exit opening: (13) Pull cord for pulling down black shade 14 (14) Black roller shade: (15) Black shade roller tubular case: (16) Under ground footing for supporting wall structure: (18) Polyurethane foam insulation: (19) Sheet material enclosing foam; (20) Support for holding platform 5 in position: (21) Windows in Shelter structure (30) Triangular end walls of air conditioner space: (31) Triangular air conditioner space: (33) steps up to door 2. (34) Ground (or soil).

My solar air conditioner is erected by fastening roller case 15 to the out side of wall structure 3. The black shade 14 is drawn down over windows 21 by pull cord 13.

Air conditioner platform 5 composed preferably of three quarter inch plywood painted black on its upper surface is hingedly mounted at its upper most end to shelter structure wall 3. Triangular shaped insulated foam walls 30 are positioned as shown along each side of platform 5 and are like wise fastened to wall 3 by suitable angle irons not shown. A wide transparent or translucent surface (preferably corrigated) is hingedly mounted at its upper end to wall 3 on its exterior surface. With wall 3, platform 5 painted black on its upper surface and transparent or translucent surface 4 with the two triangular end foamed members 30 there is now an enclosure or a trangular space capable of housing either warm air or cooled air, which ever it is desired that the air conditioner deliver to the interior of the shelter structure.

If the sun is shining it will readily be apparent that the internal triangular space will become warm and the air inside of it will begin to circulate. This warm air will enter shelter structure 1 through air port 11 and will turn downwardly toward air port 12 to re-enter air conditioning space 31 where it will be still further heated by the solar heat before it again enters port 11 to go again into the shelter structure 1 through wall 3. This warm air can be trapped along the way by a bin full of small cobble stones (or the like) if it is desired to hold the warm air condition in the shelter structure 1 over a 24 hour or longer time period.

On the other hand, if it is desired to cool the interior of the shelter structure, blower 10 can be started up and blow the cool air in the shelter structure, through the triangular air conditioning space 31 after midnight (or until the sun comes up in the morning).

Since the prime purpose of this invention is to reduce the size, weight and cost of practically non-mechanical air conditioning equipment, and to sell it as a knocked-down do-it-yourself item for the local hardware stores to sell, I may use a variety of closure devices to fasten it all together when it is finally put in place.

It is also within the scope of my invention, especially when it is to be positioned outside of a window (or windows) high up on the outside of an apartment house shelter structure, to hang the platform to the outside of the shelter structure by a pair of stainless steel cables, each cable coming down from the shelter structure exterior and fastened near each outer corner of the platform element of my air conditioning devise.

Neither of these two types of elements as mentioned in the two above paragraphs have been illustrated in the drawings. But, even so, they are integral parts of this present invention.

Moreover, there is much wisdom in making the platform itself considerably lighter in weight. To this end I may use one quarter inch outdoor plywood with two inch thick layer of foam glued to the bottom of the plywood and a 20 gague sheet metal sheet glued to the bottom of the foam sheet. In any case the upper surface of the platform is always painted black in accordance with my complete inventive concept.

I claim:

1. In a solar air conditioner having a minimum of moving mechanism, and positioned on the outside of a shelter structure whose interior is to be heated or cooled by said solar air conditioner, said air conditioner comprising a substantially flat platform extending outwardly from and connected to the outer wall of said shelter structure, a relatively thin yet substantially rigid corrugated sunlight penetrating sheet member forming a slanting roof over said platform member and of similar width, and connected to the outer wall of said shelter structure and connected along its lower edge to said platform member adjacent to the lower edge of said platform member, two similar triangular and closure end members being of heat insulating construction namely plastic foam between two rigid sheet skins each closure member fastened in a reasonably air tight manner to both side ends of said platform and said roof member, thus closing in a sizeable solar air conditioner space, an upper aperture or opening in and through the wall of said shelter structure, said upper aperture positioned near the upper portion of said air conditioner roof member, said upper aperture permitting the passage of air through said shelter structure wall, and a lower aperture or opening in and through the wall of said shelter structure permitting the passage of air through said same shelter structure wall, said lower aperture located not far from the upper edge of said platform member, said trangular air conditioning air space closed in sufficiently tightly as to prevent any flow of air elsewhere except through both said mentioned apertures, and a black pull down shade fastened to the outer wall of said shelter structure.

* * * * *

UNITED STATES PATENT OFFICE
CERTIFICATE OF CORRECTION

Patent No. 3,964,678   Dated June 22, 1976

Inventor(s) Edward J. O'Hanlon

It is certified that error appears in the above-identified patent and that said Letters Patent are hereby corrected as shown below:

The term of this patent subsequent to July 20, 1993, has been disclaimed.

Signed and Sealed this

Twenty-eighth Day of September 1976

[SEAL]

Attest:

RUTH C. MASON
*Attesting Officer*

C. MARSHALL DANN
*Commissioner of Patents and Trademarks*